Dec. 18, 1962     C. H. CROSSLEY     3,068,582
HOLDER FOR GAUGE WIRES
Filed Jan. 12, 1959
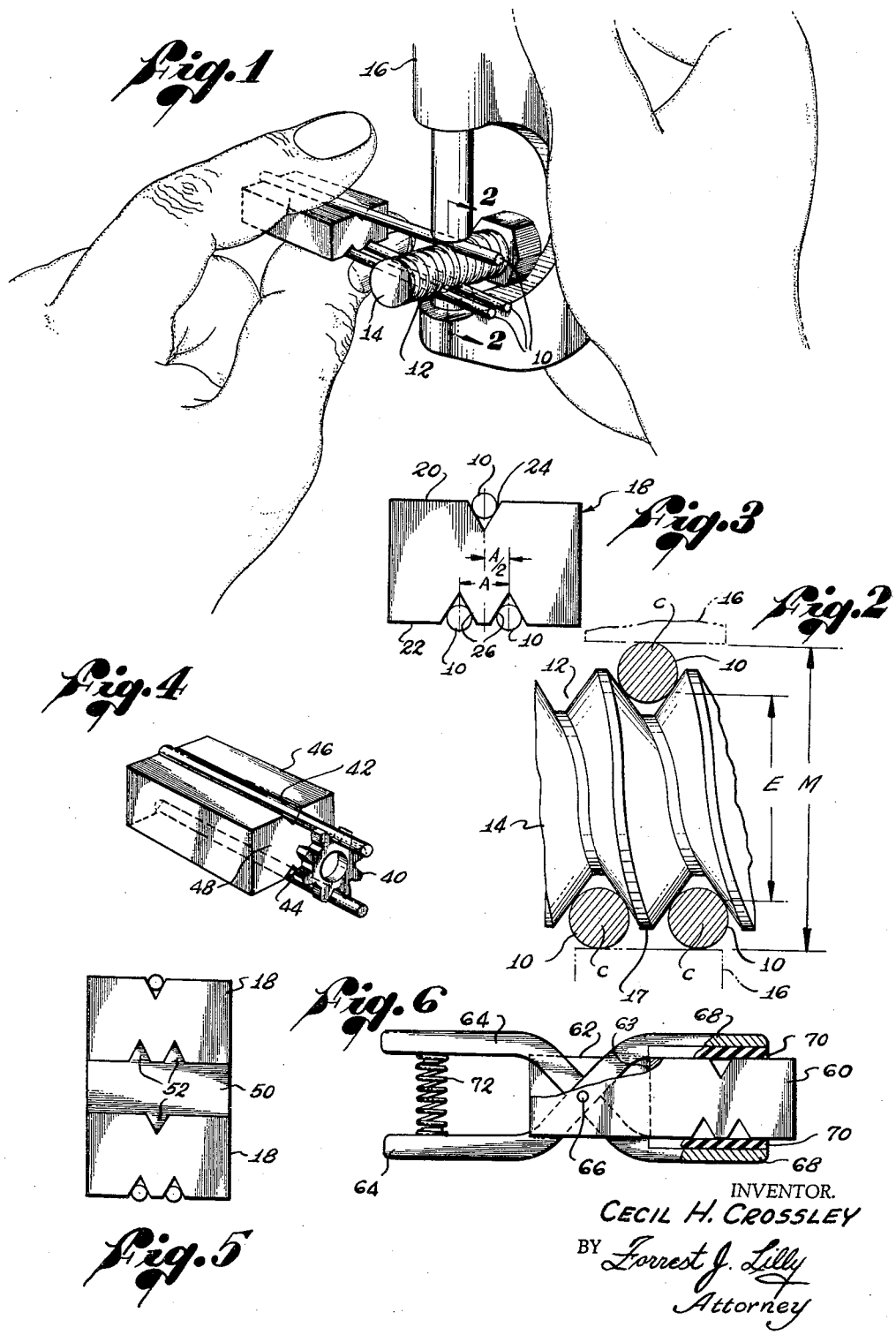
INVENTOR.
CECIL H. CROSSLEY
BY Forrest J. Lilly
Attorney 3,068,582
HOLDER FOR GAUGE WIRES
Cecil H. Crossley, 55 Hurlbut St., Pasadena, Calif.
Filed Jan. 12, 1959, Ser. No. 786,073
4 Claims. (Cl. 33—199)

This invention relates generally to the art of measuring pitch diameters of threads and gears with a micrometer and gauging wires, and more particularly to a holder for such wires to facilitate placement of the latter in proper gauging position.

The method of measuring the pitch diameter of a screw thread or gear by means of gauging wires is well known in the art. Briefly, this method involves placing gauging wires in the thread groove or between adjacent gear teeth, at diametrically opposite sides of the part whose pitch diameter is to be measured, and obtaining the "over the wire" measurement by means of a micrometer, for example. The actual pitch diameter is then determined from a calculation involving the micrometer reading, the diameter of the gauging wires, and certain constants.

Up to the present time, the gauging wires have been held in position during initial adjustment of the micrometer, by gripping them between the fingers of one hand. The extreme awkwardness and inefficiency of holding the wires in this manner are very familiar to those skilled in the art.

A broad object of the present invention is to provide a holder for gauging wires of the character described which avoids the above-noted and other difficulties.

A more specific object of the invention is to provide a holder for receiving a set of gauging wires and accurately locating the latter in proper gauging position for a particular thread or gear size.

Another object of the invention is to provide a holder for the purpose described which is adjustable to permit pitch diameter measurements on parts of different diameters.

Yet a further object of the invention is to provide a holder for the purpose described which is extremely simple in construction, inexpensive to manufacture and otherwise ideally suited to its intended purpose.

Other objects, advantages and features of the invention will become readily apparent as the description proceeds.

The invention will be best understood from the following detailed description thereof, taken in connection with the annexed drawings, wherein:

FIG. 1 is a view in perspective showing one form of the present holder being used to obtain the pitch diameter of a threaded part;

FIG. 2 is an enlarged section taken along line 2—2 of FIG. 1;

FIG. 3 is an enlarged end view of the holder of FIG. 1;

FIG. 4 is a view in perspective of a modified holder for use in gauging the pitch diameter of gears;

FIG. 5 is an end view of a further modified form of the present holder which is adjustable to accommodate the latter to parts of different diameters; and FIG. 6 illustrates a still further modified form of the present holder which embodies a clamp device for the gauging wires.

Reference is made first to FIGS. 1 through 3 which illustrate a holder for three gauging wires such as are used in the "three wire method" of measuring the pitch diameter of a screw thread. Briefly stated, this well known method of pitch diameter measurement involves placing three gauging wires 10 of accurately known diameter in the thread groove 12 of a threaded part 14, such as a thread plug gauge. As shown most clearly in FIG. 2, two of the wires are placed in adjacent turns of the thread groove at one side of the part, while the remaining wire is placed in the thread groove at the diametrically opposite side of the part.

The first step in determining the pitch diameter E of part 14 is to obtain the "over the wire" measurement M. This measurement is usually obtained with a micrometer 16 in the manner illustrated in FIG. 1. The actual pitch diameter E is then derived from a mathematical equation involving the diameter of wires 10, dimension M and certain constants of the thread 17 on part 14. Since the actual calculation of the pitch diameter is well understood in the part and forms no part of the present invention, no further discussion on this point is deemed necessary here.

The form of the present holder 18 illustrated in FIGS. 1–3 provides a means for initially locating the gauging wires 10 in the correct positions for engagement in the proper turns of the thread groove 12. Holder 18 comprises a generally rectangular block having a pair of opposite, approximately parallel side faces 20 and 22.

Face 20 of the holder has a single V groove 24 for receiving one of the wires 10. The opposite face 22 has a pair of V grooves 26 for receiving the remaining pair of wires. These grooves are approximately parallel.

The holder may be produced in various ways. For example, it may be die cast from a suitable plastic or metal. In the alternative, the holder may be made by cutting off, at desired intervals, a long bar which has been previously formed with the wire receiving grooves 24, 26.

The center spacing A between the pair of wire receiving grooves 26, in the lower face of holder 18, is made equal to the pitch of the thread 17. The groove 24 in the upper face of the holder is located midway between the lower grooves, so that the spacing, between centers, of the upper groove and each lower groove, measured in a plane parallel to the side faces 20, 22 of the holder, is A/2.

For convenience, the angle of the V grooves 24, 26 is made the same as the angle of the thread groove 12. This angle is commonly 60°. While the wire grooves are preferably V-shaped as described, grooves of other shapes, such as semicircular or rectangular, may be used.

The spacing, measured perpendicular to the holder faces 20, 22, between the single groove 24 and the pair of grooves 26 is made to correspond to the pitch diameter of a perfect thread of the same size as thread 17. That is, this latter spacing is made such that the measurement "over" the gauging wires 10, when the latter are seated in the holder grooves, is approximately the same as or slightly less than the "over the wire measurement" for a perfect thread and the particular wire size being used. Preferably, the thickness of the holder is such that the wires project slightly above the adjacent side faces of the holder.

In use, the gauging wires are seated in the grooves of the holder and the latter and wires are gripped between the fingers in the manner illustrated in FIG. 1. Part 14 to be gauged is then inserted between the wires, as shown. It will be clear from the preceding description of the holder that the grooves 24, 26 locate the wires approximately in the positions of FIG. 2 so that they engage in the proper turns of the thread groove 12 of part 14 when the latter is inserted between the wires, as just mentioned.

Wires 10 and part 14, which will be gripped between the wires, are now placed between the stem and anvil of the micrometer 16 and the latter is adjusted to obtain the "over the wire" measurement M in the manner already discussed. Finger pressure on the gauging wires is relaxed while the actual measurement is being taken to permit the wires to accurately seat in and align themselves with the thread groove.

In practice, the present holders will be made in sets comprising a plurality of holders, each designed for a particular thread size. The holders in each set may be identified as to thread size by color coding or marking them, for example.

As is well known in the art, the three wire method of pitch diameter measurement may be practiced with any sized gauging wires which contact the sides or slopes of the thread being gauged and project above the thread. The diameter of wire which touches exactly at the midslope of a perfect thread of given pitch is considered to be the optimum diameter or "best size" for that pitch, however.

It will be obvious, therefore, that the present holder may be designed for use with various wire sizes. Preferably, however, the holder, or each holder in a set, is made for use with the "best size" wire for its particular thread size.

As already noted, the spacing between the single wire groove 24 at one side of the holder and the pair of wire grooves 26 at the other side of the holder is made to correspond to a particular pitch diameter. Preferably, this latter spacing is based on the minimum pitch diameter within the allowed tolerances. This is so that a threaded part which is worn, but still within the allowed tolerance, will be gripped by, and thus will not slip from its position between the wires while the latter and part are being inserted between the stem and anvil of the micrometer in the manner described previously.

FIG. 4 illustrates a modified form of the present holder which is especially designed to hold a pair of gauging wires for measuring the pitch diameter of a gear 40. In this case, only a pair of wire receiving grooves 42 and 44 are formed in the holder 46. Also, the end face 48 of the holder is preferably in a plane exactly perpendicular to the grooves to afford a surface against which the gear may be placed to accurately locate the latter in a plane perpendicular to the gauging wires.

In holders designed for use in gauging gears having an even number of teeth and, therefore, diametrically opposed spaces between teeth, the wire grooves are located directly opposite one another, as shown. Holders designed for use in gauging gears having and odd number of teeth, on the other hand, will have one groove slightly laterally offset with respect to the other in accordance with the offset spaces between the gear teeth.

FIG. 5 illustrates a spacer 50 which may be placed between a pair of the present holders 18 to permit gauging of parts having larger pitch diameters than that for which a single holder is designed. This spacer has projections 52 for engaging in the grooves in opposing faces of the holders 18 to retain the latter in proper alignment.

It will be evident that the combination of the pair of holders 18 and spacer 50 in FIG. 5 forms a wire holder which is, in effect, adjustable to different pitch diameters, and that the spacer 50, by virtue of its ability of replacement by another spacer of different thickness, provides the means for adjusting the holder to the different pitch diameters.

The modified form of the invention illustrated in FIG. 6 comprises a wire holder 60 which is identical to the holder 18, previously described, except that holder 60 has a pair of spaced lugs 62 on one side. These lugs define a slot 63 therebetween in which a pair of crossed handles 64 are received. Handles 64 are pivotally connected to each other and to the lugs 62 by a pin 66.

Handles 64 have jaws 68 which overlie the grooved faces of holder 60. Resilient pads 70, fixed to these jaws, are urged against the faces of the holder by a spring 72 which acts between the handle 64, as shown.

The crossed handles 64, pads 70 and spring 72 form a clamp device for holding gauging wires in the grooves of the holder 60 in lieu of using finger pressure for this purpose as in FIG. 1. The clamp device is released, by squeezing the handles 64 together, to relieve the pressure on the gauging wires while the actual "over-the-wire" measurement M is being taken, for the reasons already described.

While certain preferred forms of the invention have been disclosed, it will be apparent that various modifications are possible within the spirit and scope of the following claims.

I claim:

1. For use in gauging pitch diameters, the combination of a plurality of cylindrical gauging wires, a generally rectangular holder for said wires having a pair of opposite side faces formed with approximately parallel grooves for receiving said wires and locating the latter in predetermined spaced relationship, said wires when received in said grooves extending beyond the holder for straddling a work element to be gauged, and a clamp device attached to the holder for releasably clamping said wires in said grooves.

2. For use in gauging parts, the combination of a plurality of cylindrical gauging wires, and a holder for said wires including a rectangular block having a pair of opposite, approximately parallel side faces and an end face, said side faces having open, approximately parallel V grooves opening laterally through said side faces, respectively, and opening at one end through said end face, said wire seating in said grooves, respectively, and extending beyond said end face for straddling a part to be gauged, and said wires being located in predetermined relative positions by said grooves and being exposed along the entire length of the grooves, whereby said block and wires can be gripped to apply pressure to said wires between the ends of said grooves for holding the wires firmly in the grooves while the wires are being located in gauging position about a part to be gauged and the gripping pressure on said wires can be relaxed while the part is being gauged to permit said wires to move with respect to said holder and thereby freely adjust themselves to the part.

3. For use in gauging the pitch diameter of screw threads, the combination of three cylindrical gauging wires and a holder for said wires including a rectangular block having a pair of opposite side faces and an end face, one of said side faces having two open, approximately parallel V grooves for receiving two of said gauging wires, respectively, and the other side face having a single open V groove approximately parallel to and located approximately midway between said pair of grooves for receiving the third gauging wire, said grooves opening laterally through said side faces, respectively, and opening at one end through said end face, said wires seating in said grooves, respectively, and extending beyond said end face for straddling a part to be gauged, and said wires being located in predetermined relative positions by said grooves and being exposed along the entire length of the grooves, whereby said block and wires can be gripped to apply pressure to said wires between the ends of said grooves for holding the wires firmly in the grooves while the wires are being located in gauging position about a part to be gauged and the gripping pressure on said wires can be relaxed while the part is being gauged to permit said wires to move with respect to said holder and thereby freely adjust themselves to the part.

4. The subject matter of claim 2, wherein said holder includes means for adjusting the spacing between said side faces.

(References on following page)

References Cited in the file of this patent

UNITED STATES PATENTS

| | | |
|---|---|---|
| 1,033,346 | Reamy | July 23, 1912 |
| 2,014,668 | Rinderknecht | Sept. 17, 1935 |
| 2,399,624 | Bunch | May 7, 1946 |
| 2,431,021 | Bourdelais | Nov. 18, 1947 |
| 2,445,402 | Malmberg | July 20, 1948 |
| 2,822,624 | Klink | Feb. 11, 1958 |

FOREIGN PATENTS

| | | |
|---|---|---|
| 216,443 | Switzerland | Dec. 1, 1941 |
| 672,657 | Great Britain | May 21, 1952 |

OTHER REFERENCES

Publ. Amer. Mach., Sept. 16, 1943, page 107 (copy in Library). Note plane end face on holder A and gauge wires B to test a gear.